3,116,142
WELDING MATERIAL
Rolf E. Rylander, Cleveland, Leonard Gelfand, South Euclid, and Lynn J. Ebert, Euclid, Ohio, assignors to Erico Products, Inc., Cleveland, Ohio, a corporation of Ohio
No Drawing. Filed Dec. 23, 1959, Ser. No. 861,439
16 Claims. (Cl. 75—27)

The present invention relates to a welding material and, more particularly, to an exothermic reaction mixture or composition containing various metal additives and reducible compounds thereof.

A welding composition disclosed in Patent No. 2,229,045 to Cadwell has been very successfully employed in the cast welding of rail bonds to the sides of rails and for many other purposes. Such welding material comprises a mixture of copper oxide and a crushed copper-aluminum alloy which when ignited will produce a charge of molten copper suitable for immediate use in the welding of a copper or copper alloy stranded conductor to a steel rail or the like. Patent No. 2,277,014 to Noble G. Carlson discloses a form of rail bonding apparatus particularly suited for use with the aforesaid welding material in the attachment of rail bonds to rails, such apparatus comprising two spaced mold blocks and common clamping means therefor adapted to clamp the same against the side of a rail head. Patent No. 2,654,129 to Edward B. Neff teaches an improved form of cast welding apparatus adapted to be employed with the metal producing exothermic reaction mixture.

Further development has shown that the physical properties of a weld, made by Thermit reaction mixtures of the Cadwell type, can be unexpectedly improved in various respects by the use of certain metal additives or alloying materials. For example, Patent No. 2,870,499 to Burke discloses advantages arising from the addition of tin.

In such an exothermic reaction mixture of the Cadwell type, at least the following desiderata should usually be met:

(1) The reaction mixture should be sufficiently non-violent, that is, controllable.
(2) The reaction mixture should form welds free of hot-cracking which results from insufficient liquid phase material to fill the voids caused by normal cooling shrinkage in the metal.
(3) The reaction mixture should form welds having reasonably good tensile strength and electrical conductivity.
(4) The reaction mixture should form welds having corrosion resistant characteristics similar to that of copper.

It is possible to predict to some degree the net effect of metal additions to a basic copper Thermit mix. However, certain side effects accompany these additions which are often unpredictable. For instance, cadmium additions produce a very violent reaction mixture and also generate toxic vapors. Calcium is very difficult to handle and also provides poor, porous welds. Porous or "puffy" welds are, of course, undesirable because of resulting low strength and electrical conductivity. Lead and bismuth additions either produce hot-cracking or undue vaporization.

It has now been discovered that an improved welding composition providing a controllable, exothermic reaction mixture can be realized by employing in a basic Thermit mix additions of manganese, columbium (or niobium), molybdenum, and preferably chromium and nickel, as well as reducible compounds of all of such metals. In accordance with the present welding composition, a copper alloy is produced capable of welding together copper conductors, such as cable, bus bars, tubing, and the like, or welding stranded conductors to steam rail and cast iron pipe. The weld produced from the present reaction mixtures has high mechanical strength, good electrical conductivity and ductility, shock-resistance, and furthermore is free from hot-cracks and porosity.

It is, therefore, a principal object of the present invention to provide an improved welding composition comprising an exothermic basic copper Thermit mix.

Another object is to provide an exothermic reaction mixture capable of producing a weld of improved physical properties.

A further object is to produce an exothermic reaction mixture which is sufficiently non-violent to be controllable.

A still further object is to provide a reaction mixture capable of producing a weld having outstanding properties of elongation, reduction of area, strength, and high electrical conductivity.

Other objects of the invention will become apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

The present welding composition comprises a mixture of copper oxide, aluminum or a copper-aluminum alloy or mixture, preferably a flux, and a metal additive selected from the group consisting of chromium, nickel, manganese, columbium, molybdenum, and reducible compounds thereof. If desired, two or more of such metals and/or their reducible compounds may be used in combination.

The oxide of copper forming the principal constituent of the mixture and from which the principal volume of the resultant weld metal is derived is preferably in the form of roasted copper rolling mill scale. This metal scale is composed of flat scales of various size and varying degrees of oxidation. The finer particles are black in color which indicate a higher degree of oxidation than occurs in the larger scales of red color. It is understood, of course, that while the metal scale is desired and has been found preferable both from the standpoint of its operation as well as its cost, pure $Cu_2O$ may be employed.

Normally, in an exothermic reaction mixture of the Thermit type, it is necessary to use an alloy of copper and aluminum to provide a controllable reaction. If instead aluminum alone is used, the reaction becomes too violent for practical applications. We have now found that the metal additives of the present invention have such a drastic cooling effect that their presence in the exothermic reaction mixture sufficiently controls the temperature and rate of the reaction even though aluminum alone is used instead of an aluminum-copper alloy or mixture. This is advantageous since pure aluminum is less expensive than an aluminum-copper alloy. When aluminum alone is so used in a reaction mixture, the combined amounts of the metal additive and flux are proportionately increased to compensate for most if not all of the omission of copper.

However, for an exothermic mixture having a more controllable rate and temperature of reaction, it is still preferred to use a copper-aluminum alloy or mixture. Such alloy or mixture may contain in weight percent from about 30 percent to about 70 percent copper and from about 70 percent to about 30 percent aluminum, the preferred composition being about 50 percent copper and about 50 percent aluminum. As previously indicated, the use of the crushed or finely divided copper-aluminum alloy, instead of granulated aluminum as the reducing agent, reduces the violence of the reaction and adds volume to the molten copper resulting from the exothermic reaction while permitting the reaction to proceed at a sufficient rate to maintain the proper temperature necessary for the production of the molten welding metal. In other words, sufficient copper as metal is included to absorb a substantial amount of the heat generated by the reaction.

The fluxes which may be employed are those known in the art and are exemplified by calcium, silicon, fluorspar, and cryolite. The use of fluxes enhances the soundness of the weld material.

It will be appreciated that the principal objective of the metal additions herein defined is to furnish chromium, nickel, manganese, columbium, or molybdenum for incorporation in the ultimate weld metal. Accordingly, in addition to using the metals themselves, it is possible to use them in chemical combination with other elements, the latter either burning away or forming part of the slag depending upon their own physical characteristics. Oxygen-containing reducible compounds such as sodium chromate, sodium meta-columbate, sodium molybdate, and potassium permanganate may also be employed. Usually, the preferred reducible compound is the oxide of the metal. There is an advantage in using a compound of the metal as compared to the pure metal in that as the compound is reduced, the metal is released in a nascent-like active state which enables the metal to be dissolved almost instantly in the molten metal charge that ultimately forms the weld. The formation of a metal from its oxide, as described in this process, yields the metal at the highest temperature attainable, thereby aiding in alloying the metal with the basic copper charge and often providing a molten state for the entire welding material.

The copper mill scale and the aluminum or copper-aluminum alloy are preferably in such finely divided form to pass through a 16 mesh screen and be retained on a 100 mesh screen. Similarly, the herein defined metal additives may be in granular form sufficient to pass through a 20 mesh screen and be retained on a 100 mesh screen. However, the additives are preferably in the form of powders sufficiently comminuted to pass 100 percent through a 100 mesh screen, 50 percent through a 200 mesh screen, and 5 percent or less through a 325 mesh screen, since the additives in this form dissolve more readily in the molten alloy.

In producing the improved exothermic reaction mixtures of the present invention, a reaction mixture is used such as that taught in the Cadwell Patent No. 2,229,045, adding a relatively small amount from about 0.2 to about 10 percent by weight of the alloying metal based on the weight of the pure metal. When the additive is in the form of an oxide or other reducible compound or alloy, the additive may be present in an amount from about 0.2 to about 15 percent by weight of the mixture with corresponding proportionate reductions in the balance of the ingredients. Best results are obtained when the present metal additives are used within the range of about 1 percent to about 5 percent by weight. Preferably, the additive is used by way of substitution for an equivalent amount of the copper present as metal in the reaction mixture. Thus, the basic mixture will ordinarily comprise from about 30 to about 90 parts by weight of copper oxide (roasted copper mill scale), from about 14 to about 30 parts by weight of the copper-aluminum alloy and from about 0.2 to about 10 parts by weight of a present metal additive based on the weight of the metal. As previously indicated, a flux preferably is used and in an amount from about 1 to about 5 parts by weight of the mixture based on the parts-by-weight ranges just described.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

*Example I*

| | Parts by weight |
|---|---|
| Copper scale (roasted) | 75.40 |
| 50/50 copper-aluminum alloy | 17.94 |
| Calcium silicon | 2.35 |
| Fluorspar | 2.35 |
| Chromium metal | 1.96 |
| | 100.00 |

*Example II*

| | |
|---|---|
| Copper scale | 74.37 |
| 50/50 copper-aluminum alloy | 19.06 |
| Calcium silicon | 2.32 |
| Calcium fluoride | 2.32 |
| Chromium oxide | 1.93 |
| | 100.00 |

*Example III*

| | |
|---|---|
| Copper scale (roasted) | 71.55 |
| Copper-aluminum alloy, crushed | 17.02 |
| Calcium silicon | 2.23 |
| Calcium fluoride (fluorspar) | 2.23 |
| Chromium metal | 6.97 |
| | 100.00 |

*Example IV*

| | |
|---|---|
| Copper scale roasted | 75.02 |
| 50/50 copper-aluminum alloy | 17.86 |
| Calcium silicon | 2.34 |
| Fluorspar | 2.34 |
| Manganese metal | 2.44 |
| | 100.00 |

*Example V*

| | |
|---|---|
| Copper scale | 74.23 |
| 50/50 copper aluminum alloy | 19.20 |
| Calcium silicon | 2.32 |
| Calcium fluoride | 2.32 |
| Manganese dioxide | 1.93 |
| | 100.00 |

*Example VI*

| | |
|---|---|
| Copper scale (roasted) | 70.08 |
| Copper-aluminum alloy, crushed | 16.64 |
| Calcium silicon | 2.09 |
| Calcium fluoride | 2.09 |
| Manganese metal | 9.10 |
| | 100.00 |

*Example VII*

| | |
|---|---|
| Scale (roasted) | 75.32 |
| Copper-aluminum alloy | 18.15 |
| Calcium silicon | 2.38 |
| Calcium fluoride | 2.38 |
| Nickel metal | 0.99 |
| | 100.00 |

*Example VIII*

| | |
|---|---|
| Scale (roasted) | 70.07 |
| Copper-aluminum alloy | 22.83 |
| Calcium silicon | 2.19 |
| Calcium fluoride | 2.18 |
| Nickel oxide (NiO) | 12.73 |
| | 100.00 |

Example IX

| | |
|---|---|
| Scale (roasted) | 76.09 |
| Copper-aluminum alloy | 18.11 |
| Calcium silicon | 2.37 |
| Calcium fluoride | 2.43 |
| Molybdenum metal | 1.00 |
| | 100.00 |

Example X

| | |
|---|---|
| Scale (roasted) | 74.53 |
| Copper-aluminum alloy | 19.05 |
| Calcium silicon | 2.32 |
| Calcium fluoride | 2.30 |
| Molybdenum oxide | 1.80 |
| | 100.00 |

Example XI

| | |
|---|---|
| Copper scale (roasted) | 70.39 |
| Copper-aluminum alloy, crushed | 19.45 |
| Calcium silicon | 2.20 |
| Calcium fluoride | 2.20 |
| Molybdenum metal | 5.76 |
| | 100.00 |

Example XII

| | |
|---|---|
| Copper scale (roasted) | 74.47 |
| 50/50 copper-aluminum alloy | 18.90 |
| Calcium silicon | 2.34 |
| Calcium fluoride | 2.35 |
| Columbium metal | 1.94 |
| | 100.00 |

Example XIII

| | |
|---|---|
| Copper scale (roasted) | 68.27 |
| Copper-aluminum alloy | 20.24 |
| Calcium silicon | 2.14 |
| Calcium fluoride | 2.14 |
| Sodium meta-columbate | 7.21 |
| | 100.00 |

Example XIV

| | |
|---|---|
| Copper scale (roasted) | 74.19 |
| Aluminum metal | 10.17 |
| Calcium silicon | 2.82 |
| Calcium fluoride | 2.82 |
| Columbium metal | 10.00 |
| | 100.00 |

Example XV

| | |
|---|---|
| Copper scale (roasted) | 73.26 |
| Aluminum metal | 9.04 |
| Copper metal | 3.62 |
| Calcium silicon | 2.28 |
| Calcium fluoride | 2.28 |
| Chromium oxide | 9.52 |
| | 100.00 |

In practice, the ingredients of the welding composition are intimately mixed and dispersed among each other. The mixture may then be used in many applications. For example, a mixture may be placed in a cartridge and used in a manner described in the cited Patent No. 2,229,045 to Cadwell. In this event, a starting or igniting powder known in the art may be placed in the cartridge contiguous to the reaction mixture. Or the reaction mixture may be used as shown and described in the cited Patent No. 2,870,499 to Burke. During the reaction, the additive metals herein disclosed alloy with the copper of the resulting weld.

The properties of the weld metal obtained from the present mixtures show an increase in percent elongation and reduction of area which are direct measurements of ductility. The ultimate strength of a weld obtained from the present reaction mixtures is increased from about 5 to about 10 percent as compared to welds obtained from prior mixtures. Similarly, the relative electrical conductivity of welds obtained from the present mixtures is 25 percent to 35 percent better than the improved reaction mixture described in the Burke Patent No. 2,870,499. The range of the tensile strength of welds procured from the instant mixtures extends from 40,000 p.s.i. to 60,000 p.s.i., the reduction of area and elongation range in specimens prepared from the present mixtures range from about 15 percent to 35 percent, and the electrical conductivities range from about 20 to 30 percent, pure copper being rated at 100 percent conductivity.

As specific instances, a weld metal obtained from a basic reaction mixture, as hereinbefore described, with 2 percent chromium shows a 200 to 250 percent increase in reduction of area and elongation, an increase of 5 to 10 percent in electrical conductivity, and an increase of about 5 to 10 percent in ultimate strength as compared to welds obtained from prior mixes. Similarly, a weld metal obtained from a basic reaction mixture and 2.5 percent manganese shows a 50 to 100 percent increase in reduction of area and elongation and about 10 percent to 15 percent increase in electrical conductivity. Molybdenum and manganese additions also show an improvement in a brazing effect as well as strength as compared to a weld metal obtained by the reaction mixture described in Patent No. 2,870,499.

A further benefit from these additions results in heat being withdrawn from the exothermic reaction mixture for use in melting the added metal, thereby providing a non-violent, controlled reaction. When the metal additive is in the form of a reducible compound, such as the oxide, this tends to add to the heat of the reaction. A corresponding amount of copper may, therefore, be added again to compensate and effect a controllable reaction. This in turn may be accomplished by using copper metal or a copper alloy of suitable grain size, for instance, the copper-aluminum alloy previously described.

The slagging characteristics of the present reaction mixtures are also improved over the tin-containing mixture described in Burke Patent No. 2,870,499. The slag obtained by the present reaction mixtures is of a brittle nature and tends to shrink away from a mold cavity so that removal is facilitated. In short, the addition of chromium, nickel, manganese, columbium, molybdenum, and reducible compounds thereof to a basic copper Thermit mix provides a weld metal capable of welding copper conductors, copper alloy conductors, copper to steel, and copper to cast iron. The weld metal shows substantial improvement over the weld metal formed from previously known reaction mixtures, particularly as to electrical conductivity and ductility.

While it is not intended to limit the invention by any theory of operation, it is postulated that in some manner the present additions effect their beneficial results without unduly detracting from the relatively high electroconductivity of copper, which, of course, is one of the chief reasons copper is used. According to one theory, when solute metal atoms are present as a homogeneous mixture in the solvent copper atoms, the electrical conductivity of the copper is materially reduced. It is theorized that the present additives tend to crystallize in segregated areas or isolated batches upon cooling, thus tending to leave greater areas for free electron exchange, that is, greater conductivity. Therefore, there is not such a loss of electrical conductivity in the copper itself, while the presence of such additives can still benefit the resulting alloy, such as in strength and ductility.

As a further unexpected property in welds procured from the present mixtures, it is emphasized that strength and ductility are considered as opposites in metallurgy. That is, an additive can be made to enhance one of these properties or the other, but not both. Yet in accordance with the present invention, unexpected improvement has been noted in both such physical characteristics in the resulting welds. It is possible that more slip systems are activated in the crystals or atomic spacial arrangements in the weld without substantially decreasing its strength. This makes it difficult to fracture the alloy along such planes while still improving the ductility of the weld.

Further, with respect to hot-cracking, the present additives result in a broadening of the range of temperatures during which solidification can take place instead of one temperature or a relatively short temperature range. This has the effect of easily accommodating metallurgical changes as the weld cools without forming cracks.

It will be noted that even within the lower range of the amounts in which the present additives are used, the quantity is not what is sometimes referred to as a "tramp" impurity. Often the presence of very small quantities of an additive is not sufficiently large to alloy with other metals as desired, so that the net effect of such presence is a harmful one.

It will now be apparent that the present invention provides an improved welding composition of an exothermic basic copper Thermit mix. The reaction of the mixture is controllable, and welds obtained from the mixtures have improved physical properties, particularly improved electrical conductivity and ductility, as compared to prior mixes. The resulting welds are free of hot-cracking, porosity, and other deleterious results.

Other forms embodying the features of the invention may be employed, change being made as regards the features herein disclosed, provided those stated by any of the following claims or the equivalent of such features be employed.

We therefore particularly point out and distinctly claim as our invention:

1. In a welding composition for use in an exothermic reaction consisting essentially of a mixture of copper oxide and aluminum as the sole reducing agent, the improvements of an additive selected from the group consisting of chromium, nickel, columbium, molybdenum, and reducible compounds thereof, said additive being present in an amount based on the additive metal from about 0.2 percent to about 10 percent by weight of the mixture.

2. In a welding composition for use in an exothermic reaction consisting essentially of a mixture of copper oxide and a copper-aluminum alloy, the improvements of an additive selected from the group consisting of chromium, nickel, columbium, molybdenum, and reducible compounds thereof, said additive being present in an amount based on the additive metal from about 0.2 percent to about 10 percent by weight of the mixture.

3. In an exothermic reaction mixture for producing a molten copper alloy consisting essentially of a mixture of copper oxide, a sufficient amount of aluminum to reduce said oxide, and sufficient additional metal effective in combination with said aluminum to absorb a substantial amount of the heat generated by the reaction, the improvements of an additive selected from the group consisting of chromium, nickel, columbium, molybdenum, and reducible compounds thereof, said additive being present in an amount based on the additive metal from about 0.2 percent to about 10 percent by weight of the mixture.

4. In an exothermic reaction mixture for producing a molten copper alloy consisting essentially of a mixture of copper oxide, a sufficient amount of aluminum to reduce said oxide, and sufficient copper as metal in combination with said aluminum effective to absorb a substantial amount of the heat generated by the reaction, the improvements of an additive selected from the group consisting of chromium, nickel, columbium, molybdenum, and reducible compounds thereof, said additive being present in an amount based on the additive metal from about 0.2 percent to about 10 percent by weight of the mixture.

5. In an exothermic reaction mixture for producing a molten copper alloy consisting essentially of a mixture of finely divided copper oxide, a sufficient amount of aluminum to reduce said oxide and sufficient copper as metal effective to absorb a substantial amount of the heat generated by the reaction, said aluminum and copper being present as a crushed alloy; the improvement of a metal additive admixed therewith and selected from the group consisting of chromium, nickel, columbium, molybdenum, and reducible compounds thereof, said additive being present in an amount effective to constitute from about 1 percent to about 5 percent by weight of the molten metal resulting from such exothermic reaction.

6. An exothermic reaction mixture for producing a molten copper alloy consisting essentially of:

| | Parts by weight |
|---|---|
| Copper scale (roasted) | 30 to 90 |
| Copper-aluminum alloy | 14 to 30 |
| Flux | 1 to 5 |
| Metal additive | 0.2 to 10 | wherein said metal additive is selected from the group consisting of chromium, nickel, columbium, molybdenum, and reducible compounds thereof, the latter being present in an amount to furnish a metal content within the defined range.

7. The exothermic reaction mixture of claim 6 wherein said copper-aluminum alloy comprises from about 30 to about 70 percent copper and from about 70 to about 30 percent aluminum.

8. The exothermic reaction mixture of claim 6 wherein said copper-aluminum alloy comprises about 50 percent copper and about 50 percent aluminum.

9. An exothermic reaction mixture for producing a molten copper alloy consisting essentially of:

| | Parts by weight |
|---|---|
| Copper scale (roasted) | 71 to 76 |
| Copper-aluminum alloy, crushed | 17 to 20 |
| Calcium silicon | 2 to 3 |
| Calcium fluoride (fluorspar) | 2 to 3 |
| Chromium | 1 to 7 |

10. An exothermic reaction mixture for producing a molten copper alloy consisting essentially of:

| | Parts by weight |
|---|---|
| Copper scale (roasted) | 70 to 76 |
| Copper-aluminum alloy, crushed | 18 to 23 |
| Calcium silicon | 2 to 3 |
| Fluorspar | 2 to 3 |
| Nickel | 2 to 9 |

11. An exothermic reaction mixture for producing a molten copper alloy consisting essentially of:

| | Parts by weight |
|---|---|
| Copper scale (roasted) | 74 to 77 |
| Copper-aluminum alloy, crushed | 18 to 20 |
| Calcium silicon | 2 to 3 |
| Calcium fluoride | 2 to 3 |
| Molybdenum | 1 to 5 |

12. An exothermic reaction mixture for producing a molten copper alloy consisting essentially of:

| | Parts by weight |
|---|---|
| Copper scale (roasted) | 68 to 75 |
| Copper-aluminum alloy | 10 to 21 |
| Calcium silicon | 2.1 to 2.9 |
| Calcium fluoride | 2.1 to 2.9 |
| Columbium | 1 to 10 |

13. An exothermic reaction mixture for producing a molten copper alloy consisting essentially of:

| | Parts by weight |
|---|---|
| Copper scale (roasted) | 74.19 |
| Aluminum metal | 10.17 |
| Calcium silicon | 2.82 |
| Calcium fluoride | 2.82 |
| Columbium metal | 10.00 |

14. A method of welding a copper workpiece to an iron-containing metallic article comprising exothermically reducing copper oxide by a reducing agent consisting essentially of aluminum in the presence of an additive selected from the group consisting of chromium, nickel, columbium, molybdenum, and reducible compounds thereof to produce reduced molten metal, and molding such molten metal about the copper workpiece and metallic article to weld the workpiece and article together.

15. A method of welding a copper workpiece to an iron-containing metallic rail comprising exothermically reducing copper oxide by a reducing agent consisting essentially of aluminum and a copper-aluminum alloy in the presence of an additive selected from the group consisting of chromium, nickel, columbium, molybdenum, and reducible compounds thereof, such additive being present in an amount based on the additive metal from about 0.2 percent to about 10 percent by weight of such reactants, producing molten metal by such reduction, and molding the molten metal about such workpiece and rail to secure them together with a weld free of hot-cracking.

16. A method of welding a copper workpiece to a steel rail comprising exothermically reducing copper oxide by a reducing agent consisting essentially of aluminum and a copper-aluminum alloy effective to absorb a substantial amount of heat generated by such reduction and in the presence of an additive selected from the group consisting of chromium, nickel, columbium, molybdenum and reducible compounds thereof, such additive being present in an amount based on the additive metal from about 0.2 percent to about 10 percent by weight of such reactants, producing molten metal by such reduction, alloying the molten additive metal with the molten copper, and then molding the resulting molten metal alloy about such workpiece and rail to secure them together with a weld free of hot-cracking.

References Cited in the file of this patent

UNITED STATES PATENTS

| | | |
|---|---|---|
| 2,229,045 | Cadwell | Jan. 21, 1941 |
| 2,430,419 | Edens | Nov. 4, 1947 |
| 2,482,093 | Carlson | Sept. 20, 1949 |
| 2,755,182 | Cape | July 17, 1956 |
| 2,768,893 | Bredzs | Oct. 30, 1956 |
| 2,831,760 | Rejdak | Apr. 22, 1958 |
| 2,891,860 | Woolard | June 23, 1959 |
| 2,911,298 | Woolard | Nov. 3, 1959 |